US012773704B2

(12) United States Patent
Lee

(10) Patent No.: US 12,773,704 B2
(45) Date of Patent: Oct. 27, 2026

(54) LIQUID CONTENT-DISCHARGING CONTAINER

(71) Applicant: PUM-TECH KOREA CO., LTD, Incheon (KR)

(72) Inventor: Do Hoon Lee, Incheon (KR)

(73) Assignee: PUM-TECH KOREA CO., LTD, Incheon (KR)

( * ) Notice: Subject to any disclaimer, the term of this patent is extended or adjusted under 35 U.S.C. 154(b) by 117 days.

(21) Appl. No.: 18/569,980

(22) PCT Filed: Jul. 8, 2022

(86) PCT No.: PCT/KR2022/009937
§ 371 (c)(1),
(2) Date: Dec. 13, 2023

(87) PCT Pub. No.: WO2023/008772
PCT Pub. Date: Feb. 2, 2023

(65) Prior Publication Data

US 2025/0262633 A1 Aug. 21, 2025

(30) Foreign Application Priority Data

Jul. 30, 2021 (KR) ........................ 10-2021-0100502

(51) Int. Cl.
*B05B 11/00* (2023.01)
*A45D 34/00* (2006.01)
(Continued)

(52) U.S. Cl.
CPC .......... *B05B 11/0067* (2013.01); *A45D 34/00* (2013.01); *A45D 34/04* (2013.01);
(Continued)

(58) Field of Classification Search
CPC ............. B05B 11/0062; B05B 11/0067; B05B 11/0008; B05B 11/0038; B05B 11/0072;
(Continued)

(56) References Cited

U.S. PATENT DOCUMENTS 3,863,673 A * 2/1975 Sitton ........................ B67C 9/00
222/545
3,913,804 A * 10/1975 Laauwe ............... B65D 83/164
222/402.11
(Continued)

FOREIGN PATENT DOCUMENTS

DE 19627228 A1 * 1/1998 ......... B05B 11/1077
DE 10330040 A1 * 1/2005 ......... B05B 11/1067
(Continued)

OTHER PUBLICATIONS

Machine translation of JP-2003192067-A (Year: 2025).*

*Primary Examiner* — Paul R Durand
*Assistant Examiner* — Michael C Patterson
(74) *Attorney, Agent, or Firm* — Heedong Chae; Lucem, PC

(57) ABSTRACT

A liquid content-discharging container includes: an inner container in which a liquid content is received; an outer container surrounding the exterior of the inner container; a shoulder coupled to the inner container or the outer container; a discharge unit installed in the shoulder and connected to the inner container to discharge the liquid content; a button connected to one side of the discharge unit to operate the discharge unit and having a discharge passage formed therein; a nozzle coupled to one side of the button and having a discharge port; and an opening/closing means which is formed inside the button and the nozzle and opens/closes the discharge port and the discharge passage
(Continued)

simultaneously or continuously when moved back and forth due to the discharge pressure of the liquid content.

8 Claims, 9 Drawing Sheets

(51) Int. Cl.
*A45D 34/04* (2006.01)
*A45D 40/00* (2006.01)
*A47K 5/12* (2006.01)
*B05B 11/02* (2023.01)
*B05B 11/10* (2023.01)

(52) U.S. Cl.
CPC ............ *A45D 40/00* (2013.01); *A47K 5/1201* (2013.01); *A47K 5/1205* (2013.01); *B05B 11/0008* (2013.01); *B05B 11/0038* (2018.08); *B05B 11/0044* (2018.08); *B05B 11/0054* (2013.01); *B05B 11/0075* (2013.01); *B05B 11/026* (2023.01); *B05B 11/1047* (2023.01); *B05B 11/105* (2023.01); *B05B 11/1053* (2023.01); *A45D 2200/056* (2013.01); *A45D 2200/057* (2013.01); *B05B 11/1023* (2023.01); *B05B 11/1074* (2023.01)

(58) Field of Classification Search
CPC ............. B05B 11/1023; B05B 11/1074; B05B 11/0044; B05B 11/0054; B05B 11/0075; B05B 11/026; B05B 11/1047; B05B 11/105; B05B 11/1053; A45D 34/00; A45D 40/00; A45D 2200/056; A45D 34/04; A45D 2200/057; A47K 5/1205; A47K 5/1201
USPC ................. 222/401, 380, 509, 511, 514, 518
See application file for complete search history.

(56) References Cited

U.S. PATENT DOCUMENTS 3,990,640 A * 11/1976 Laauwe ............. B65D 83/7535 239/533.1
4,153,203 A * 5/1979 Tada ................... B05B 11/1074 239/493
4,182,496 A * 1/1980 Burke ................. B05B 11/0067 222/394
4,830,284 A * 5/1989 Maerte ................ B05B 11/1023 239/487
5,042,697 A * 8/1991 Warren .................. B65D 83/44 222/402.1
5,273,191 A * 12/1993 Meshberg ........... B05B 11/0075 222/402.1
5,558,258 A * 9/1996 Albini ................. B05B 11/1016 222/496
5,636,768 A * 6/1997 Yamada .............. B05B 11/1063 222/496
5,988,449 A * 11/1999 Fuchs ................. B05B 11/1016 222/321.6
6,824,021 B2 * 11/2004 Masuzzo ............. B05B 11/1016 222/321.7
7,048,155 B2 * 5/2006 Kuwahara ........... B05B 11/1053 222/321.9
7,172,098 B2 * 2/2007 Garcia ................. B65D 83/345 222/402.15
8,083,159 B2 * 12/2011 Leuliet .................. B05B 1/3436 222/402.1
8,245,887 B2 * 8/2012 Ohshima ............. B05B 11/0027 222/375
8,413,912 B2 * 4/2013 Songbe ............... B05B 11/0067 239/337
8,584,908 B2 * 11/2013 Kakuta ............... B05B 11/1097 222/321.9
9,381,530 B2 * 7/2016 Moretti ............... B05B 11/1016
10,086,395 B2 * 10/2018 Goettke .............. B05B 11/1074
10,155,243 B2 * 12/2018 Mersmann .......... B05B 11/1016
2002/0088873 A1 * 7/2002 Blake .................... B05B 1/3457 239/106
2006/0255072 A1 * 11/2006 Hagin ................. B05B 11/0072 222/321.7
2007/0221686 A1 * 9/2007 Bae ........................ A45D 34/02 222/409
2008/0017666 A1 * 1/2008 Vanblaere ............. B65D 83/44 222/380
2009/0250534 A1 * 10/2009 Suzuki ................... B65D 83/44 239/583
2011/0121037 A1 * 5/2011 Kakuta ............... B05B 11/0067 222/320
2014/0231540 A1 * 8/2014 Greiner-Perth ........... B05B 1/18 239/102.2
2014/0312072 A1 * 10/2014 Knight ................ B05B 11/0005 222/384
2014/0346196 A1 * 11/2014 Byeon ................... B05B 11/028 222/321.3
2018/0236466 A1 * 8/2018 Laidler ............... B05B 11/0067
2020/0023391 A1 * 1/2020 Cesare ............... B65D 75/5883
2020/0047202 A1 * 2/2020 Hennemann ........ B05B 11/1004
2020/0055644 A1 * 2/2020 Höhm ..................... B05B 11/04
2020/0384491 A1 * 12/2020 Hennemann ........ B05B 11/1035

FOREIGN PATENT DOCUMENTS

JP 2003192067 A * 7/2003
JP 2009-006305 A 1/2009
JP 5443036 B2 3/2014
KR 10-2008-0024354 A 3/2008
KR 10-2011-0023299 A 3/2011
KR 101261027 B1 * 5/2013 ......... B65D 47/2068
KR 20-0467636 Y 7/2013
KR 20130143465 A * 12/2013 ......... A45D 40/0075
KR 10-1376050 B1 3/2014
KR 20-0472286 Y1 4/2014
KR 101812944 B1 * 12/2017 ............. A45D 34/04
KR 101931452 B1 * 12/2018 ............. A45D 34/04
KR 102021064 B1 * 9/2019 ......... B05B 11/0037
WO WO-2020095014 A1 * 5/2020 ........... B05B 15/525

* cited by examiner

LIQUID CONTENT-DISCHARGING CONTAINER

TECHNICAL FIELD

In today's modern society, both men and women of all ages use cosmetics upon needs in accordance with the rapid diversification trend of the times. Particularly, women use cosmetic products and cosmetic tools with various types and various colors, and various high-quality cosmetic products and tools are being released into the market everyday through the research and development of cosmetics-related companies.

The cosmetics are classified, based on the purpose of use, into facial cleansing cosmetics used for removing sebum, wastes and contaminants on a surface of a skin, base cosmetics used for properly supplying moisture and oil to the skin, color cosmetics used for expressing beautiful colors, hair cosmetics used for protecting hairs and supplying nutrition as well as removing foreign substances from hairs or scalp, and perfumes obtained by dissolving fragrant materials in alcohol or the like and used for giving a fragrance to others.

In addition, the cosmetics are manufactured from natural raw materials as interest in the stability of cosmetic compositions and the skin beauty are increased due to the improvement of living standards. However, since preservatives are not added to the above cosmetics to minimize irritation to the skin, the risk of deterioration is relatively high compared to cosmetics manufactured from chemical raw materials. For example, the cosmetics manufactured from natural raw materials may be contaminated or deteriorated when bacteria permeate due to contact with external air during use or the composition is oxidized due to contact with air.

In addition, in order to store and use cosmetics in a liquid or gel form, such as lotions, creams, gels, shampoos, and hair conditioners, among the above cosmetics, a container having a simple opening/closing function is generally used. The cosmetics are put from the container by using a spatula or a finger and applied to the skin or hair. However, the above conventional container fails to constantly control the amount of discharged cosmetics, and thus the cosmetics are wasted.

Accordingly, a pump-type cosmetic container capable of constantly controlling the discharge amount of cosmetics has been developed so that contact between cosmetics and outside air is minimized, and convenience in use is facilitated.

The pump-type cosmetic container includes a container body configured to accommodate contents; a pressurized pump provided in an opening of the container body and operated by pressing; and a nozzle head coupled to an upper portion of the container body while being connected to the pressurized pump, wherein the contents accommodated in the container body are discharged to the outside by a predetermined amount by the pumping operation of the pressurized pump when the nozzle head exposed to the outside is pressed downward.

According to the above-described pump-type cosmetic container, the contents accommodated in the container body may be prevented from coming into contact with outside air, it may be economical because the contents are not excessively discharged through a discharge port of the nozzle, and it may be convenient to use because the cosmetic container operates even when the container body is placed on the floor.

However, according to the pump-type cosmetic container, since a discharge port for discharging the contents to the outside is always opened, the discharged content may not be finished cleanly and may flow downward from the nozzle, thereby causing a mess. In addition, the contents remaining in the discharge port and the discharge passage may be exposed to the outside for a long period of time and hardened to block the discharge port or cause unsanitariness due to due to contamination or deterioration of ingredients.

In order to solve the above-mentioned problems, the applicant of the present invention filed the application entitled "VISCOUS FLUID DISCHARGE PUMP STRUCTURE" and registered under Korean Utility Model Registration No. 20-0467636. The above related art includes: a coupling body having a mounting portion attached to and detached from a storage container for storing a viscous fluid; a pump body positioned above the coupling body and moving up and down inside the coupling body; a nozzle head mounted to pass through the pump body and having a fluid discharge hole for discharging the viscous fluid guided along a discharge passage inside the pump body; and an opening/closing unit that opens the fluid discharge hole by a pressure applied to the pump body to discharge the viscous fluid to the outside of the pump body, and blocks the fluid discharge hole when the discharge of the viscous fluid is completed.

However, according to the above related art, since the contents may be hardened at an end of a nozzle, an inner end of the nozzle and an opening/closing portion incompletely come into close contact with each other or an elastic restoring force of an elastic spring is decreased, thereby forming a gap between the opening/closing portion and the nozzle, and accordingly, sealing inside the nozzle and pump body fail to be properly maintained.

In addition, according to the above related art, since the contents are accommodated inside the storage container without a refill container, and the storage container is screw-coupled to the coupling body, it may be inconvenient to replace the storage container when the content contained in the storage container is entirely exhausted.

DOCUMENTS OF CONVENTIONAL ART

Patent Documents (Patent Document 1) Korea Patent Publication No. 10-2011-0023299 (published on Mar. 8, 2011)

(Patent Document 2) Korean Patent Registration No. 10-1376050 (published on Mar. 19, 2014)

(Patent Document 3) Korean Utility Model Registration No. 20-0467636 (published on Jul. 2, 2013)

DISCLOSURE

Technical Problem

In order to solve the above problems, an object of the present invention is to provide a liquid content-discharging container in which an opening/closing unit is operated by a discharge pressure of a liquid content to open and close a discharge port of a nozzle and a discharge passage of a button together, thereby doubly sealing the inside of the nozzle and the button to stably block contact between the liquid contents and external air, so that the liquid contents may be prevented from being contaminated and deteriorated.

Technical Solution

In order to achieve the above-mentioned object, the present invention provides a liquid content-discharging container including: an inner container for accommodating a liquid content; an outer container surrounding an exterior of the inner container; a shoulder coupled to the inner container or the outer container; a discharge unit installed inside the shoulder and connected to the inner container to discharge the liquid content; a button connected to one side of the discharge unit to operate the discharge unit and having a discharge fluid channel formed therein; a nozzle coupled to one side of the button and formed therein with a discharge port; and an opening/closing unit formed inside the button and the nozzle to simultaneously or sequentially open/close the discharge port and the discharge fluid channel while reciprocating due to a discharge pressure of the liquid content.

In addition, the inner container may include a pouch container having a shape changed when the liquid contents contained therein are consumed.

In addition, the inner container may include a soft receiving portion in which the liquid contents are accommodated, and a hard coupling portion joined to the receiving portion so as to be coupled to the shoulder.

In addition, the inner container and the outer container may be formed therein with a detachable protrusion and a detachable groove, respectively, so that the inner container and the outer container may be detached from each other by a rotational operation between the inner container and the outer container.

In addition, the shoulder may be formed therein with a first drain hole and the outer container may be formed therein with a second drain hole, so that water introduced between the shoulder and the button sequentially may pass through the first drain hole and the second drain hole and be discharged to an outside.

In addition, the discharge unit may be a pump that pumps the liquid contents contained in the inner container.

In addition, the discharge passage of the button may be formed therein with a sealing blade to come into close contact with an outer circumference of the opening/closing unit.

In addition, the sealing blade of the button may protrude from an inner wall of the discharge passage and be inclined at a predetermined angle in a discharge direction of the liquid contents.

In addition, the button and the discharge unit may be connected to each other through a connection unit, and the connection unit may be formed therein with a connection path.

In addition, a button stopper may be detachably coupled to an outer side of the button to prevent the button from being pressed.

In addition, the opening/closing unit may include an opening/closing rod reciprocating back and forth by the discharge pressure of the liquid contents, and an elastic member for providing elasticity to the opening/closing rod.

In addition, the opening/closing rod of the opening/closing unit may include a first sealing portion for sealing the discharge port, a second sealing portion for sealing the discharge passage, a fitting portion fitted to the elastic member, and a guide blade protruding from an outer circumference of the opening/closing rod to come into close contact with an inner wall of the discharge passage, and the second sealing portion may have a diameter relatively larger than a diameter of the first sealing portion.

Advantageous Effects

According to the embodiment of the present invention, an opening/closing unit is operated by a discharge pressure of a liquid content to open and close a discharge port of a nozzle and a discharge passage of a button together, thereby doubly sealing the inside of the nozzle and the button to stably block contact between the liquid contents and external air, so that the liquid content can be prevented from being contaminated and deteriorated.

According to the embodiment of the present invention, the outer container may be easily attached to and detached from the inner container by a simple rotational operation between the inner container for containing the liquid contents and the outer container for surrounding an outer side of the inner container, so that the inner container can be conveniently replaced after the outer container is separated.

According to the embodiment of the present invention, a first drain hole and a second drain hole are formed in the shoulder and the outer container, respectively, and accordingly, water introduced between the button and the shoulder is discharged to the outside sequentially through the first and second drain holes without remaining inside the shoulder or between the inner and outer containers, so that hygienic use can be implemented.

BEST MODE

Mode for Invention

Figure 1:
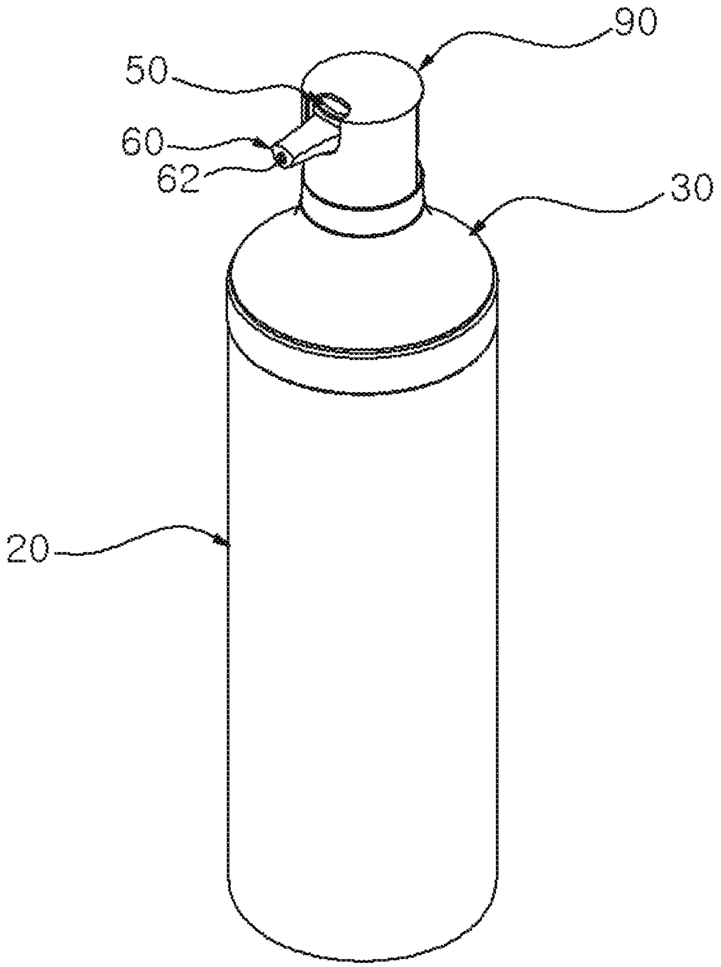
FIG. 1 is a perspective view of a liquid content-discharging container according to the embodiment of the present invention.

Hereinafter, the detailed descriptions of the present invention are embodiments for carrying out the present invention, and the corresponding embodiment refers to the accompanying drawings as an example. The embodiments will be described in detail to enable those skilled in the art to carry out the present invention. It is apparent to be understood that the various embodiments of the present invention may be different from each other but do not need to be mutually exclusive. For example, the particular shape, structure, and feature described herein may be embodied in other embodiments without departing from the idea and scope of the present invention in connection with the embodiment. In addition, it will be understood that the location or arrangement of an individual element within each disclosed embodiment may be modified without departing from the idea and scope of the present invention.

Accordingly, the following detailed description does not disclose a limited meaning, and the scope of the invention is limited only by the appended claims, along with the full scope of equivalents to which the claims are entitled, if properly explained. Similar reference numerals in the drawings refer to the same or similar function throughout several aspects.

General terms widely used recently have been selected in the present invention in consideration of the function according to the present invention as possible, however, the terms may vary depending on the intention of those skilled in the art, judicial cases, the advent of new technology, or the like. In addition, in certain cases, the terms may be arbitrarily selected by the applicant, and in this case, the meaning thereof will be described in detail in the relevant description of the invention. Therefore, the terms used in the present invention will be defined based on the meaning of the term and contents throughout the present invention, not simply on the names of the terms.

When one part “includes” one element in the present invention, the above expression does not exclude other elements, but may further include the other elements, unless particularly stated otherwise.

Hereinafter, a liquid content-discharging container according to the embodiment of the present invention will be described in detail with reference to the accompanying drawings.

Figure 2:
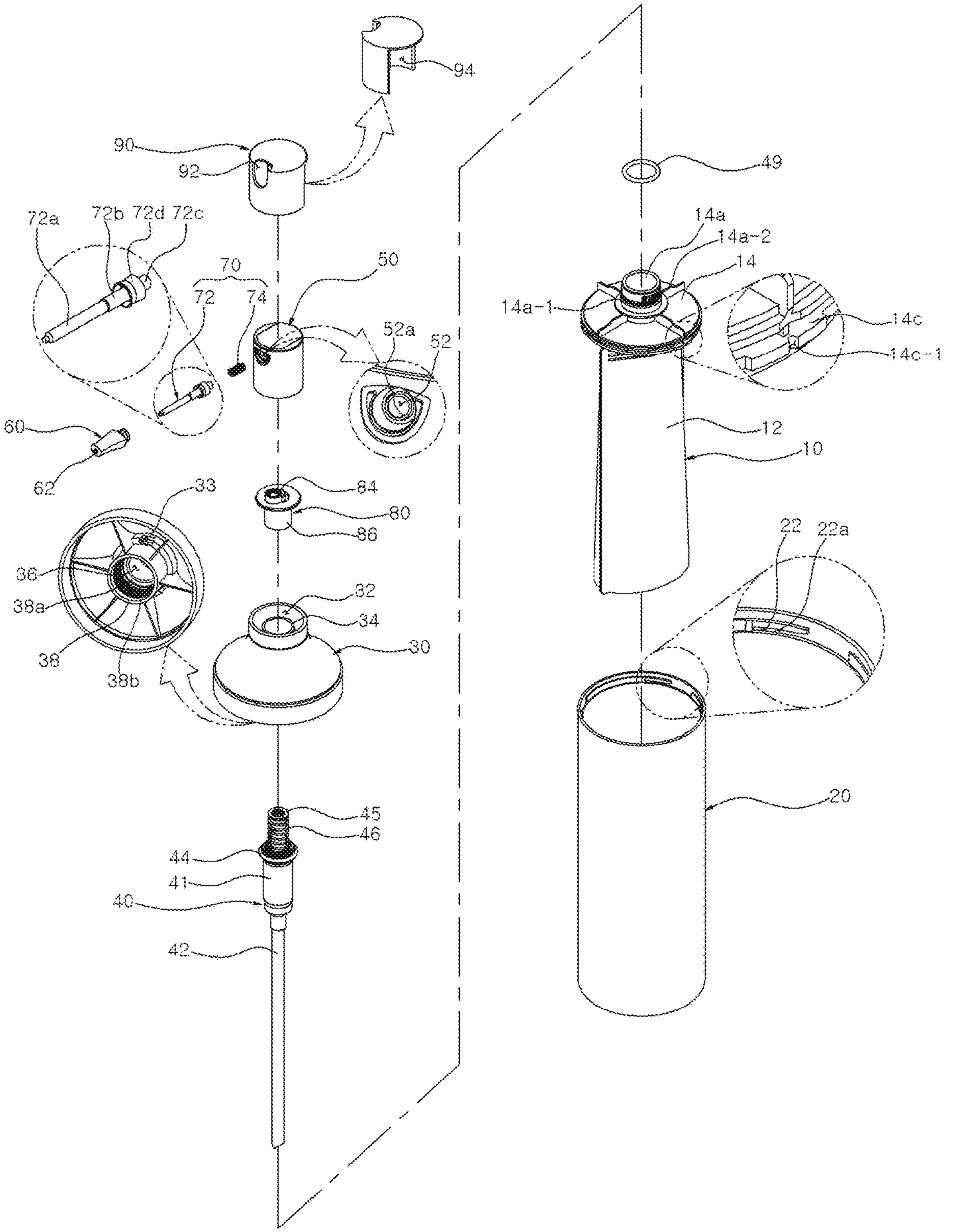
FIG. 2 is an exploded perspective view of the liquid content-discharging container according to the embodiment of the present invention.
Figure 3:
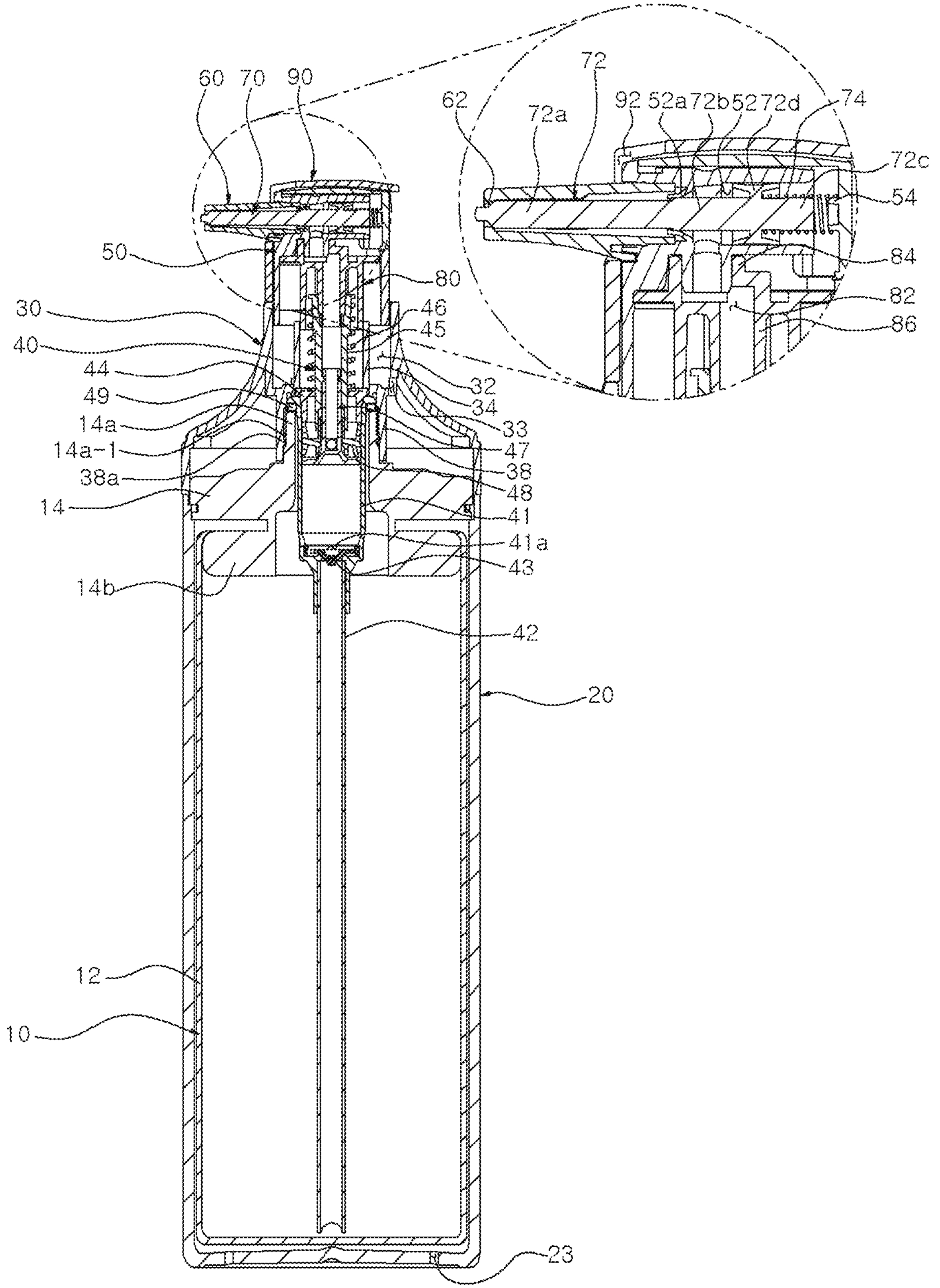
FIG. 3 is a sectional view of the liquid content-discharging container according to the embodiment of the present invention.
Figure 6:
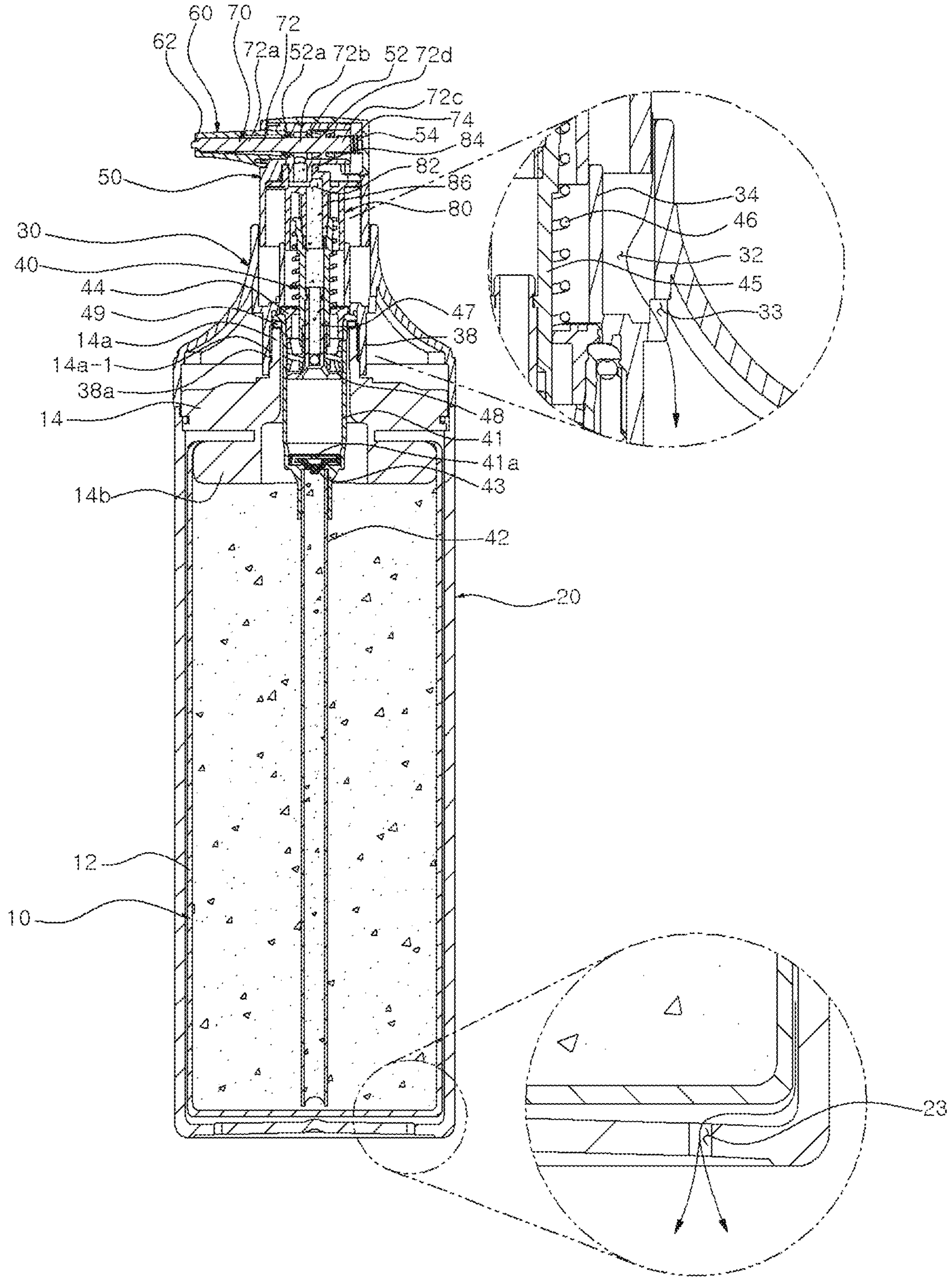
FIG. 6 is a sectional view illustrating a state in which water introduced between the button and the shoulder is drained according to the embodiments of the present invention.
Figure 7:
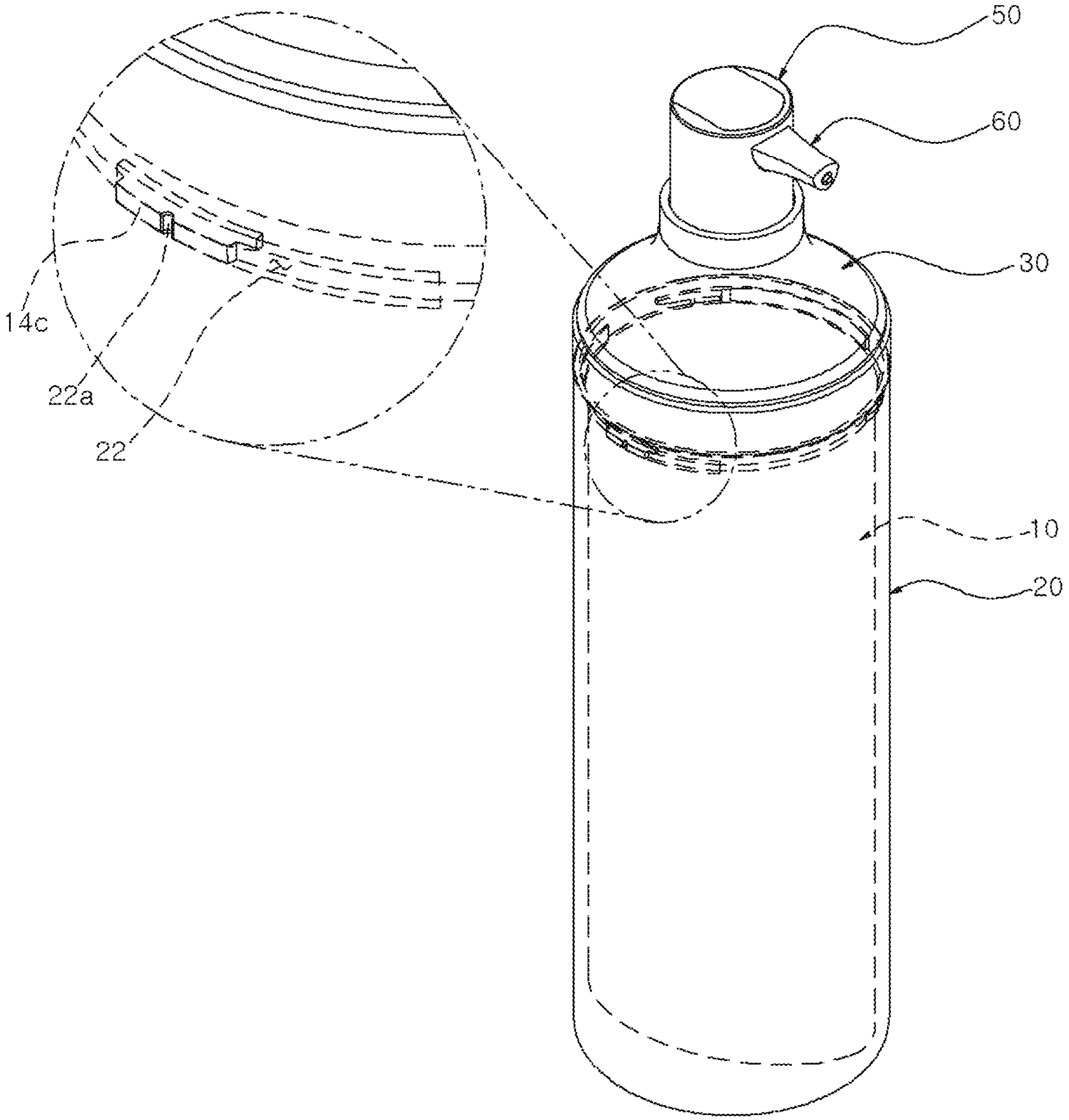
FIG. 7 is a perspective view illustrating an attachment and detachment structure between inner and outer containers of the liquid content-discharging container according to the embodiment of the present invention.

FIG. 1 is a perspective view of a liquid content-discharging container according to the embodiment of the present invention. FIG. 2 is an exploded perspective view of the liquid content-discharging container according to the embodiment of the present invention. FIG. 3 is a sectional view of the liquid content-discharging container according to the embodiment of the present invention. FIG. 6 is a sectional view illustrating a state in which water introduced between the button and the shoulder is drained according to the embodiments of the present invention. FIG. 7 is a perspective view illustrating an attachment and detachment structure between inner and outer containers of the liquid content-discharging container according to the embodiment of the present invention.

As shown in the drawings, the liquid content-discharging container according to the embodiment of the present invention may include an inner container 10, an outer container 20, a shoulder 30, a discharge unit 40, a button 50, a nozzle 60, and an opening/closing unit 70.

Hereinafter, the liquid content-discharging container according to the embodiment of the present invention will be described separately for each component as follows.

The inner container 10 served as a storage container in which liquid contents are stored, and has an inside maintained in a vacuum state, so that the liquid contents are safely stored. The liquid contents may include any content in a liquid or gel state, such as cosmetics, shampoo, or soap. it may be preferable that the inner container 10 is a pouch container having a shape changed as the liquid contents contained therein are consumed.

The inner container 10 may include a soft receiving portion 12 in which the liquid contents are accommodated, and a hard coupling portion 14 joined to the receiving portion 12 so as to be coupled to the shoulder 30.

As shown in FIG. 2, the coupling portion 14 is formed on one side thereof with an inlet portion **14*a* into which the liquid contents are injected and at least a part of the discharge unit 40 is inserted, the inlet portion 14*a* is formed on an opposite side thereof with a joint portion 14*b* to which the receiving portion 12 is joined while surrounding the joint portion 14*b*, and a detachable protrusion 14*c* protrudes on an edge of the coupling portion 14 so as to be detachably coupled to the outer container 20. A fixing groove 14*c*-1 may be formed on the detachable protrusion 14*c* in which the fixing groove 14*c*-1 is configured to prevent the inner container 10 and the outer container 20 from being arbitrarily rotated with respect to each other when the inner container 10 and the outer container 20** are fastened to each other.

A ring-shaped first fastening protrusion **14*a*-1 may be formed along an outer circumference of the inlet portion 14*a* and fastened to the shoulder 30, and at least one first anti-rotation protrusion 14*a*-2 may be formed at a position adjacent to the first fastening protrusion 14*a*-1 so as to be spaced apart at a predetermined distance along the circumference of the inlet portion 14*a* and coupled to the shoulder 30**.

The outer container 20 protects the inner container 10 while surrounding the outside of the inner container 10. The outer container 20 has a hard cylindrical shape with one side opened to define an appearance of the liquid content-discharging container. The outer container 20 is not limited to the cylindrical shape, and may be formed in various shapes and formed of various materials in consideration of types of contents stored therein, usability, design factors, or the like. However, it may be preferable that the outer container 20 has a narrow width, a relatively long length and a gentle bottom so as to be easily gripped with a hand by a user and easily placed on the floor.

As shown in FIG. 7, a detachable groove 22 may be formed on an upper inner circumference of the outer container 20 and fastened to the detachable protrusion **14*c* of the inner container 10, and accordingly, a detachable structure may be implemented between the outer container 20 and the inner container 10 through a rotational operation between the inner container 10 and the outer container 20. The detachment groove 22 is a groove extending horizontally along the inner circumference of the outer container 20, in which one side is opened to allow the detachable protrusion 14*c* to be inserted thereto, and an opposite side is closed to limit a rotation range of the detachable protrusion 14*c*. A fixing protrusion 22*a* may be formed inside the detachable groove 22. When the detachable protrusion 14*c* is fastened to the detachable groove 22, the fixing protrusion 22*a* is coupled to the fixing groove 14*c*-1 of the inner container 10, thereby limiting the rotation between the inner container 10 and the outer container 20 until the user applies a predetermined force. Accordingly, the inner container 10 and the outer container 20** may be prevented from being unfastened while being rotated with each other due to an external force regardless of the user’s intention. The liquid content-discharging container according to the embodiment of the present invention is illustrated that the detachable protrusion

14*c* provided with the fixing groove 14*c*-1 is formed in the inner container 10, and the detachable groove 22 provided with the fixing protrusion 22*a* is formed in the outer container 20. However, the present invention is not limited thereto, and the positions of the detachable protrusion 14*c* provided with the fixing groove 14*c*-1 and the detachable groove 22 provided with the fixing protrusion 22*a* may be replaced with each other.

More particularly, when the inner container 10 or the outer container 20 is rotated in one direction while the inner container 10 is fully inserted into the outer container 20, the detachable protrusion 14*c* of the inner container 10 enters the detachable groove 22 of the outer container 20 so that the inner container 10 and the outer container 20 are fastened to each other, and the fixing groove 14*c*-1 of the detachable protrusion 14*c* and the fixing protrusion 22*a* of the detachable groove 22 are coupled to each other, so that the rotation between the inner container 10 and the outer container 20 is temporarily restricted. In addition, when the inner container 10 or the outer container 20 is rotated in an opposite direction, the fixing groove 14*c*-1 of the detachable protrusion 14*c* and the fixing protrusion 22*a* of the detachable groove 22 are uncoupled to each other, and the inner container 10 and the outer container 20 are in a separable state while the detachable protrusion 14*c* of the inner container 10 comes out of the detachable groove 22 of the outer container 20. In other words, the outer container 20 is easily attached to and detached from the inner container 10 through the simple rotational operation between the inner container 10 for containing the liquid contents and the outer container 20 for surrounding the outside of the inner container 10, so that the inner container 10 can be conveniently replaced after the outer container 20 is separated.

As shown in FIG. 3, at least one second drain hole 23 may be formed in the bottom of the outer container 20, in which the second drain hole 23 serves as an outlet through which the water introduced into the outer container 20 flows out.

The shoulder 30 is coupled to one side of the inner container 10 or the outer container 20 to protect the discharge unit 40 installed therein. As shown in FIG. 2, for the beauty or luxury of appearance, the continuity of design, and the like of the liquid content-discharging container, it may be preferable that the shoulder 30 has a lower part with the same diameter as the outer container 20 to come into contact with the upper end of the outer container 20, and has a narrower diameter toward the top while forming a smooth curved surface.

The shoulder 30 may be formed on an upper inner side thereof with a button insertion groove 32 into which at least a part of the button 50 is inserted, an upper extension annular protrusion 34 may extend upward from the bottom of the button insertion groove 32, and a discharge unit through-hole 36 through which the discharge unit 40 passes may be formed in a center of the upper extension protrusion wheel 34.

A lower extension protrusion wheel 38 may extend downward from a lower inner side of the shoulder 30, and the inlet portion 14*a* of the inner container 10 may be inserted and fixedly coupled to the inside of the lower extension protrusion wheel 38. The lower extension protrusion wheel 38 may be formed on an inner circumference thereof with a second fastening protrusion 38*a* undercut-coupled to the first fastening protrusion 14*a*-1 of the inner container 10, and at least one second anti-rotation protrusion 38*b* may be formed at a position adjacent to the second fastening protrusion 38*a* so as to be spaced apart at a predetermined distance along the circumference of the lower extension protrusion wheel 38 so that the first anti-rotation protrusion 14*a*-2 of the inner container 10 may be inserted therebetween. Accordingly, the inner container 10 and the shoulder 30 are rotated together while being coupled to each other without idling.

In addition, as shown in FIG. 6, a first drain hole 33 may be formed on an outer side adjacent to the lower extension protrusion wheel 38, in which the first drain hole 33 serves as an outlet to allow water introduced into a gap between the shoulder 30 and the button 50 to move to the inside of the outer container 20. In other words, when the liquid content-discharging container is filled with shampoo, rinse, or soap and used in a bathroom or the like, water may be introduced into the gap between the button and the shoulder or between the shoulder and the outer container, and the water introduced may remain inside the liquid content-discharging container for a long time and become corrupted to cause hygiene problems. Thus, in the liquid content-discharging container according to the embodiment of the present invention, the first drain hole 33 and the second drain hole 23 are formed in the shoulder 30 and the outer container 20, respectively, the water introduced between the button 50 and the shoulder 30 is prevented from remaining inside the shoulder 30 or between the inner container 10 and the outer container 20, and sequentially passes through the first drain hole 33 and the second drain hole 23 so as to be discharged to the outside, so that more hygienic use can be implemented.

The discharge unit 40 is installed inside the shoulder 30 and connected to the inner container 10, and operated by pressing the button 50 to discharge the liquid contents contained in the inner container 10. The discharge unit 40 is inserted and fixedly coupled between the inner container 10 and the shoulder 30, and has at least a part inserted into the inlet portion 14*a* of the inner container 10 and connected to the inner container 10 and a remaining part passing through the discharge unit through-hole 36 of the shoulder 30, inserted into the inside of the upper extension protrusion wheel 34 and connected to the button 50. It may be preferable that the discharge unit 40 is a pump for discharging a fixed amount of the liquid contents when being pumped.

As shown in FIG. 3, the discharge unit 40 may include a cylinder 41 inserted into the inlet portion 14*a* of the inner container 10 and formed in a lower part thereof with a content suction port 41*a*, a contents suction tube 42 extending from the content suction port 41*a* and inserted into the inner container 10, a suction valve plate 43 for opening/closing the content suction port 41*a* of the cylinder 41, a sealing cap 44 coupled to an upper part of the cylinder 41 while surrounding the upper part of the cylinder, a stem 45 reciprocating in a pumping operation direction while passing through the sealing cap 44, an elastic spring 46 for elastically supporting the stem 45, an operation discharge tube 47 coupled to the stem 45 and reciprocating together, and an operation discharge ring 48 fitted to an outer side of the operation discharge tube 47 to come into close contact with an inner circumference of the cylinder 41.

In addition, a sealing ring 49 is further formed between the cylinder 41 of the discharge unit 40 and the inlet portion 14*a* of the inner container 10 so that a sealing force of the inner container 20 can be increased. The sealing ring 49 may be formed of an elastic material for further improving the sealing force of the inner container 40, and it may be preferable to be formed of at least one material of urethane rubber, natural rubber, elastomer, nitrile-butadiene rubber (NBR), and silicone, or polypropylene, polyethylene, or acrylonitrile butadiene styrene (ABS) having elasticity material. Particularly, it is most preferable to be formed of thermos-plastic elastomer (TPE) as a material between rubber and plastic with softness and excellent durability.

The button 50 is connected to one side of the discharge unit 40, to operate the discharging unit 40 while reciprocating vertically when being pressed by the user. The button 50 may have at least a part inserted into the button insertion groove 32 of the shoulder 30 and reciprocating vertically along an upper inner wall of the shoulder 30.

A discharge passage 52 is formed inside the button 50, in which one end of the discharge passage 52 is connected to the discharge unit 40, and an opposite end is connected to the nozzle 60. The discharge passage 52 serves as a path through which the liquid contents discharged by the discharge unit 40 passes, and as a space into which the opening/closing unit 70 is inserted, and may extend horizontally across an inner space of the button 50.

As shown in the partially enlarged view of FIG. 3, a sealing blade 52*a* may be formed in the discharge passage 52 of the button 50. The sealing blade 52*a* may protrude from an inner wall of the discharge passage 52 to block the discharge passage 52 while coming into close contact with an outer circumference of the opening/closing unit 70, and may form a gap through which the liquid contents pass while being temporarily separated from the outer circumference of the opening/closing unit 70 when the opening/closing unit 70 moves horizontally due to the discharge pressure of the liquid contents. It may be preferable that the sealing blade 52*a* is formed in a ring shape inclined at a predetermined angle in a discharge direction of the liquid contents.

In addition, the button 50 and the discharge unit 40 may be connected to each other through a connection unit 80. The connection unit 80 may be formed therein with a connection path 82 for connecting the discharge passage 52 of the button 50 to an inner path of the discharge unit 40, a button coupling protrusion wheel 84 fixedly coupled to the button 50 may extend upward from an upper part thereof, and a discharge unit coupling protrusion wheel 86 fixedly coupled to a stem 45 of the discharge unit 40 may extend downward from a lower part thereof. In the liquid content-discharging container according to the embodiment of the present invention, the button 50 and the discharge unit 40 are configured to be connected by the connection unit 80, however the present invention is not limited thereto, and the button 50 and the discharge unit 40 may be directly connected and fixedly coupled without the connection unit 80.

In addition, a stopper 90 for preventing the button 50 from being pressed may be detachably coupled to an outer side of the button 50. The stopper 90 is coupled to the button 50 while surrounding an outer side surface and an upper surface thereof and has a lower end seated on the top of the shoulder 30, so that the button 50 may be prevented from being pressed unintentionally by a user's mistake or an external force. Accordingly, the button 50 is prevented from being pressed until the user separates and removes the stopper 90 from the button 50. As shown in FIG. 2, a nozzle through-hole 92 through which the nozzle 60 passes may be formed in the stopper 90, and a button insertion hole 94 into which the button 50 is inserted may be formed on an opposite side.

The nozzle 60 is coupled to one side of the button 50 to protrude outward from the button 50. The nozzle 60 is formed in a tubular shape with a hollow inside, and has at least a part inserted into the button 50 and connected to the discharge passage 52, and has an end formed with a discharge port 62 to discharge the liquid contents passing through the discharge passage 52 to the outside.

The nozzle 60 may extend in the same direction as the discharge passage 52 to smoothly discharge the liquid contents, and at least a part of the opening/closing unit 70 may be inserted into an inner space of the nozzle. In other words, when the opening/closing unit 70 reciprocates horizontally to come into close contact with or be spaced apart from an inner wall of the discharge port 62 of the nozzle 60, the discharge port 62 is selectively opened and closed, and accordingly, the cosmetics remaining inside the nozzle 60 may be prevented from being contaminated or deteriorated when coming into contact with external air.

The opening/closing unit 70 is formed inside the button 50 and the nozzle 60 to simultaneously or continuously open and close the discharge passage 52 and the discharge port 62 while reciprocating back and forth due to the discharge pressure of the liquid contents.

As shown in FIG. 3, the opening/closing unit 70 may include an opening/closing rod 72 reciprocating back and forth by the discharge pressure of the liquid contents, and an elastic member 74 for providing elasticity to the opening/closing rod 72 in the discharge direction of the liquid contents.

The opening/closing rod 72 of the opening/closing unit 70 has a round circumference and a long length so as to be inserted into the inner spaces of the button 50 and the nozzle 60, and may include a first sealing portion 72*a* inserted into the nozzle 60 to seal the discharge port 62, a second sealing portion 72*b* inserted into the button 50 to seal the discharge passage 52, a fitting portion 72*c* fitted to the elastic member 74, and a guide blade 72*d* protruding from an outer circumference of the opening/closing rod 72 to come into close contact with an inner wall of the discharge passage 52. It is preferable that the first sealing portion 72*a*, the second sealing portion 72*b* and the fitting portion 72*c* extend in a line along the operational direction of the opening/closing rod 72.

In addition, a step may be formed between the first sealing portion 72*a* and the second sealing portion 72*b*, so that the second sealing portion 72*b* may have a relatively larger diameter than the first sealing portion 72*a*. This is because, when the opening/closing unit 70 moves back and forth, the sealing blade 52*a* of the button 50 comes close contact with the outer circumference of the opening/closing rod 72, that is, the outer circumference of the second sealing portion 72*b* having the relatively large diameter to close the discharge passage 52, or is spaced apart from the outer circumference of the first sealing portion 72*a* having the relatively small diameter to open the discharge passage 52. In other words, the sealing blade 52*a* may be selectively brought into contact with the outer surface of the opening/closing rods 72 by changing a position of the opening/closing rods 72 having different diameters for each section, so that the discharge passage 52 of the button 50 is opened and closed together with the discharge port 62 of the nozzle 60. It may be preferable that the diameter of the first sealing portion 72*a* is relatively smaller than the inner diameter of the sealing blade 52*a*, and the diameter of the second sealing portion 72*b* is the same as or relatively larger than the inner diameter of the sealing blade 52*a*. However, since the operation of the opening/closing rod 72 may be disturbed when the diameter of the second sealing portion 72*b* is too large than the inner diameter of the sealing blade 52*a*. Thus, it may be preferable to adjust the difference between the diameter of the second sealing portion 72*b* and the inner diameter of the sealing blade 52*a*.

The guide blade 72*d* of the opening/closing unit 70 is formed in a ring shape on the outer circumference of the opening/closing rod 72 to come into close contact with the inner wall of the discharge passage 52, so that the opening/ closing rod 72 may be guided to move stably horizontally without being tilted to either side when the opening/closing rod 72 moves back and forth, and the liquid contents remaining inside the discharge passage 52 of the button 50 may be prevented from moving toward the elastic member 74.

The elastic member 74 may have one side fitted by surrounding the fitting portion 72*c* of the opening/closing rod 72, and an opposite side fitted by surrounding an insertion protrusion wheel 54 formed inside the button 50 to allow the opening/closing rod 72 to flexibly move back and forth.

As described above, According to the liquid content-discharging container according to the embodiment of the present invention, the opening/closing unit 70 reciprocates back and forth due to the discharge pressure of the liquid contents to open and close the discharge port 62 of the nozzle 60 and the discharge passage 52 of the button 50, thereby doubly sealing the inside of the nozzle 60 and the button 50, so that contact between the liquid contents and the external air may be stably blocked unlike the conventional liquid content-discharging containers, so as to prevent the liquid contents from being contaminated and deteriorated.

Figure 4:
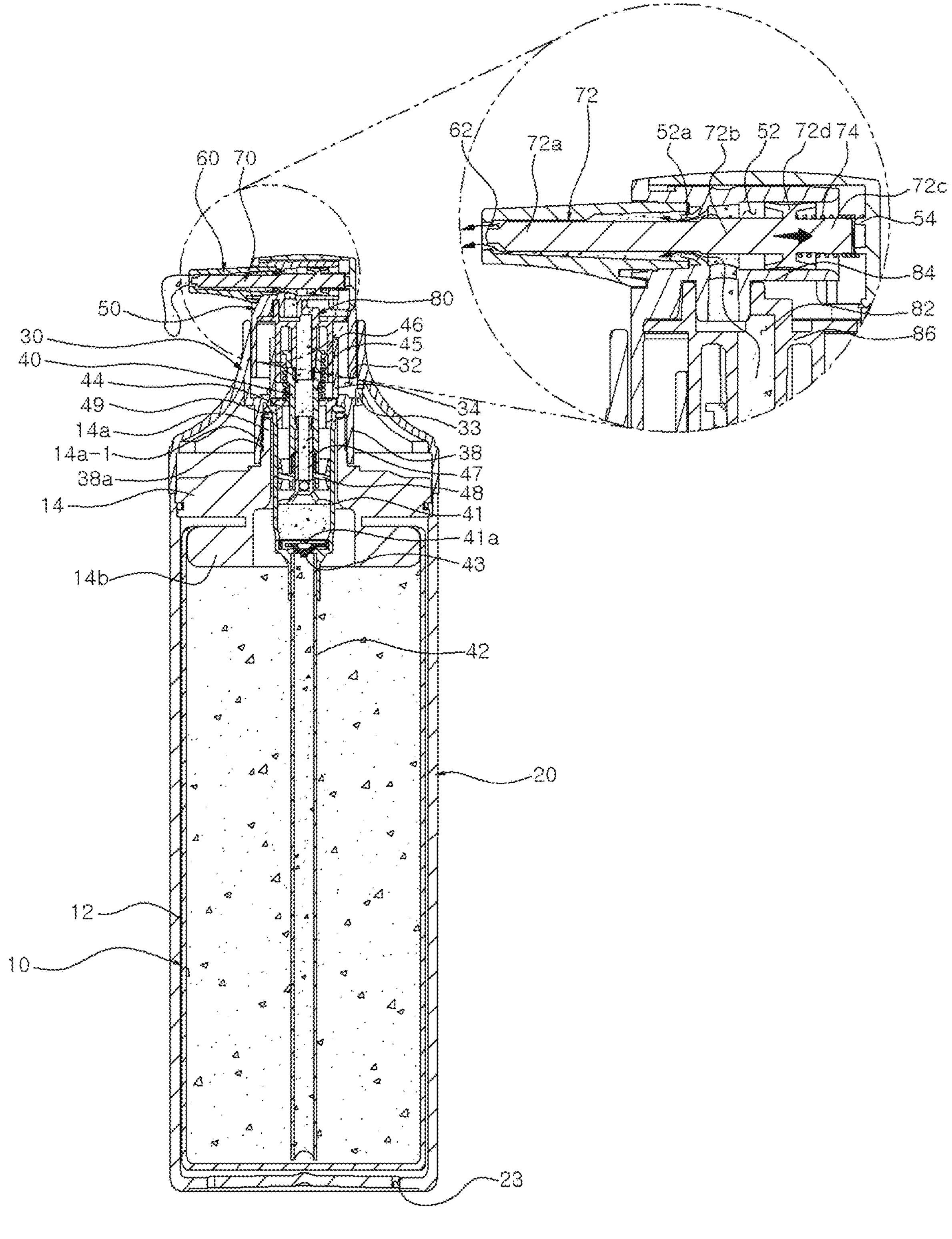
FIG. 4 is a sectional view illustrating a state in which liquid contents are discharged to the outside by pressurizing a button according to the embodiment of the present invention.
Figure 5:
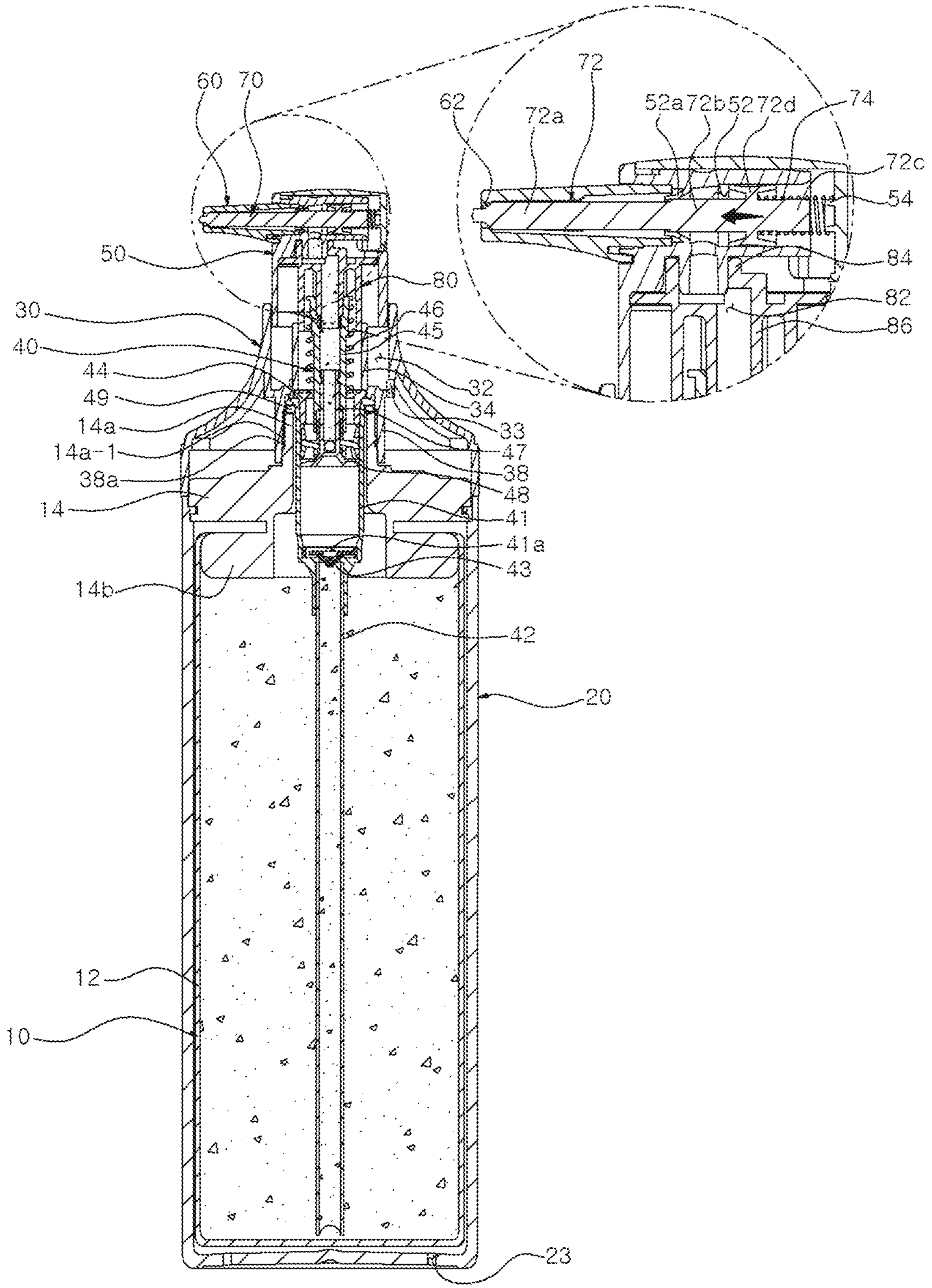
FIG. 5 is a sectional view illustrating a state in which a discharge port and a discharge passage are doubly sealed by depressurizing the button according to the embodiments of the present invention.
Figure 8:
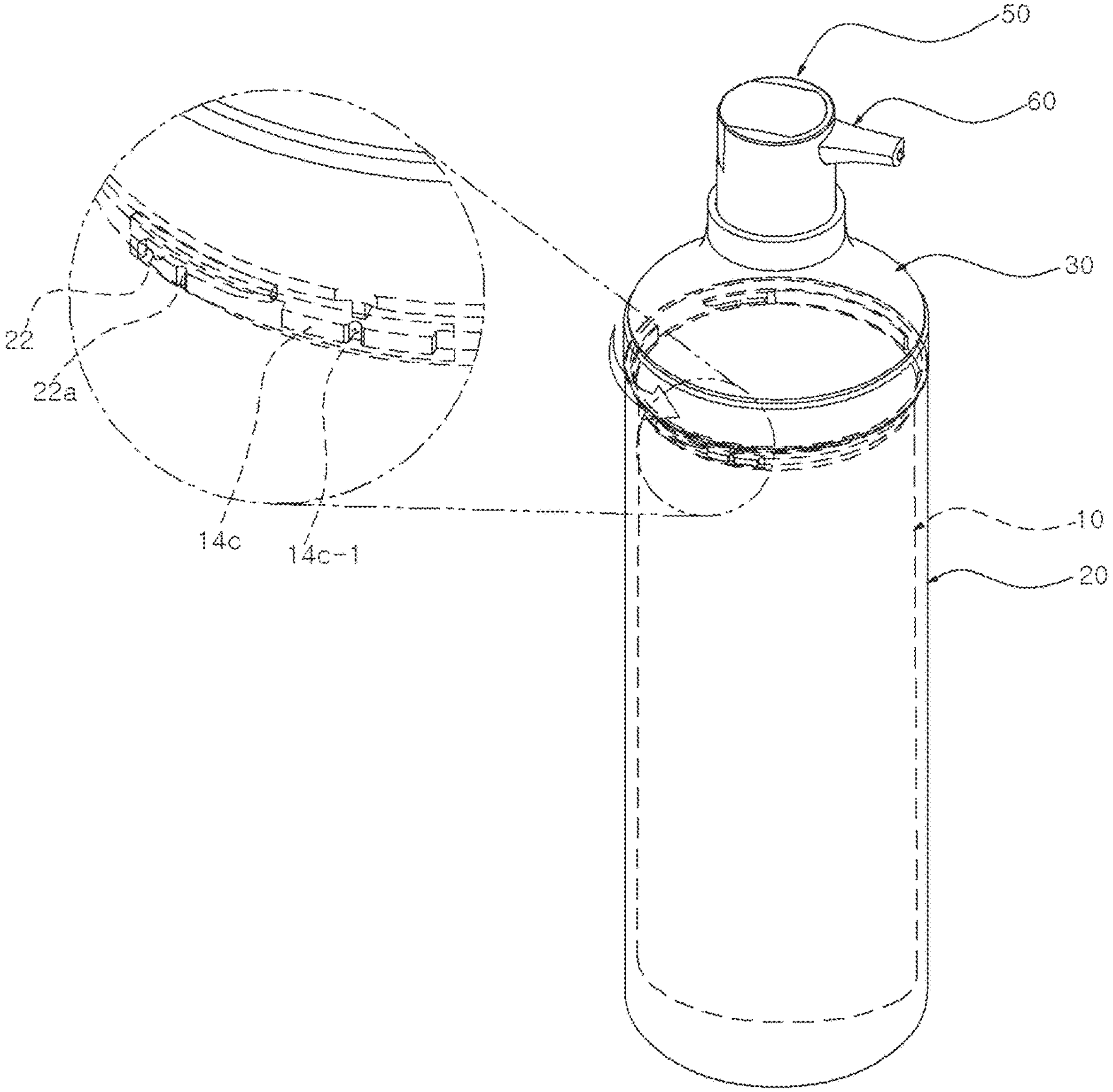
FIG. 8 is a perspective view illustrating a state in which the inner and outer containers are unfastened by rotating the shoulder or the outer container according to the embodiment of the present invention.
Figure 9:
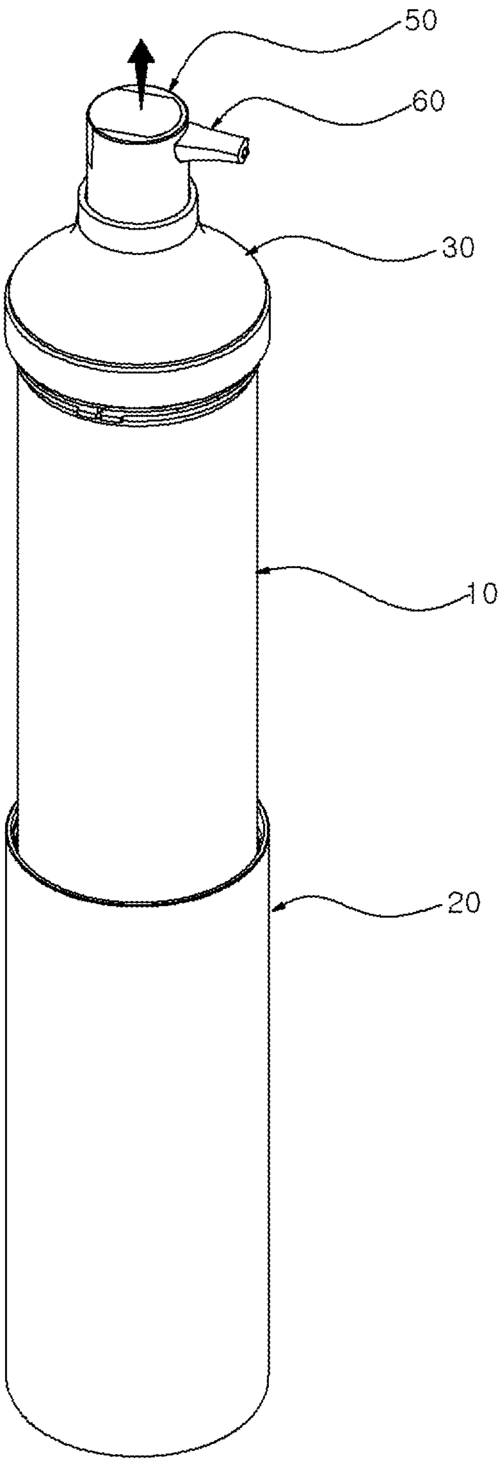
FIG. 9 is a perspective view illustrating a state in which the outer container is separated from the inner container according to the embodiments of the present invention.

FIGS. 4 and 5 are views illustrating the operation of the liquid content-discharging container according to the embodiment of the present invention. FIGS. 7 to 9 are views illustrating a refill process of the liquid content-discharging container according to the embodiment of the present invention. The operation and the refilling process of the liquid content-discharging container according to the embodiment of the present invention will be described with reference to the above drawings.

FIG. 4 is a sectional view illustrating a state in which liquid contents are discharged to the outside by pressurizing a button according to the embodiments of the present invention. FIG. 5 is a sectional view illustrating a state in which a discharge port and a discharge passage are doubly sealed by depressurizing the button according to the embodiments of the present invention.

In order to use the liquid content-discharging container according to the embodiment of the present invention, the stopper 90 surrounding the outer side of the button 50 is separated.

Thereafter, as shown in FIG. 4, the button 50 is pressed to operate the discharging unit 40. When the button 50 is pressed, the connection unit 80 coupled to the button 50 and the stem 45 and the operation discharge tube 47 of the discharging unit 40 coupled to the connection unit 80 move downward together. Since the operation discharge ring 48 comes into close contact with the inner surface of the cylinder 41, only the operation discharge tube 47 moves downward to generate a gap between the operation discharge tube 47 and the operation discharge ring 48, thereby generating a moving path for the contents. When the button 50 is further pressed, the lower end of the stem 45 moving downward by the button 50 presses the operation discharge ring 48, and accordingly, the operation discharge ring 48 moves downward together with the operation discharge tube 47, thereby reducing a volume inside the cylinder 41. Accordingly, the suction valve plate 43 closes the content suction port 41*a* due to the discharge pressure in the cylinder 41, and the liquid contents stored in the cylinder 41 come out between the operation discharge tube 47 and the operation discharge ring 48 and moves into inner paths of the operation discharge tube 47 and the stem 45.

Continuously, as shown in the partially enlarged view of FIG. 4, the liquid contents discharged from the discharge unit 40 pass through the connection path 82 of the connection unit 80 so as to be introduced into the discharge passage 52 of the button 50, and the opening/closing rod 72 of the opening/closing unit 70 is pushed rearward by the discharge pressure of the liquid contents introduced into the discharge passage 52. Simultaneously, the end of the opening/closing rod 72 is spaced apart from the inner end of the nozzle 60 to open the discharge port 62, and simultaneously or continuously, the sealing blade 52*a* of the button 50 is spaced apart from the first sealing portion 72*a* of the opening/closing rod 72 to open the discharge passage 52 through the gap therebetween, so that the liquid contents are discharged to the outside through the discharge passage 52 and the discharge port 62.

Thereafter, as shown in FIG. 5, when the pressure of the button 50 is released, the stem 45 moves upward while the elastic spring 46 elastically supporting the stem 45 of the discharge unit 40 is restored to an initial shape, and the operation discharge tube 47 coupled to the lower side of the stem 45 also moves upward. The lower part of the operation discharge tube 47 pulls the operation discharge ring 48 upward to close the gap between the operation discharge tube 47 and the operation discharge ring 48, so that the operation discharge tube 47 and the operation discharge ring 48 move upward together, and thus the volume inside the cylinder 41 is increased, thereby generating a vacuum pressure. Simultaneously, the suction valve plate 43 is lifted by the vacuum pressure generated inside the cylinder 41 to open the content suction port 41*a* formed on the bottom of the cylinder 41, so that the contents contained in the inner container 10 are introduced into the cylinder 41 through the content suction tube 42 and the content suction port 41*a*, and the receiving portion 12 of the inner container 10 is distorted by the amount of discharged contents.

As shown in the enlarged view of FIG. 5, when the discharge pressure of the liquid contents disappears, the opening/closing rod 72 of the opening/closing unit 70 moves forward by the elastic restoring force of the elastic member 74, and the end of the opening/closing rod 72 and the inner end of the nozzle 60 simultaneously come into close contact with each other to close the discharge port 62, and the sealing blade 52*a* of the button 50 and the second sealing portion 72*b* of the opening/closing rod 72 come into close contact with each other to close the discharge passage 52, so that the insides of the nozzle 60 and the button 50 are doubly sealed.

FIG. 8 is a perspective view illustrating a state in which the inner and outer containers are unfastened by rotating the shoulder or the outer container according to the embodiments of the present invention. FIG. 9 is a perspective view illustrating a state in which the outer container is separated from the inner container according to the embodiments of the present invention.

In addition, when the liquid contents contained in the inner container 10 are entirely used, the inner container 10 may be replaced and used. As shown in FIG. 8, when the shoulder 30 is rotated from the outer container 20 in one direction, the fixing protrusion 22*a* formed in the detachable groove 22 of the outer container 20 comes out of the fixing groove 14*c*-1 formed in the detachable protrusion 14*c* of the inner container and is disconnected from each other, and the detachable protrusion 14*c* of the inner container 10 moves horizontally from the detachable groove 22 of the outer container 20 and then deviates from the detachable groove 22, so that the inner container 10 and the outer container 20 are in a separable state.

Thereafter, as shown in FIG. 9, the shoulder 30 and the inner container 10 coupled to the lower part of the shoulder 30 are separated from the outer container 20, the inner container 10 is replaced, the inner container 10 is inserted into the inner space of the outer container 20 in the above manner, and then the shoulder 30 is rotated in the opposite direction to fasten the inner container 10 to the outer container 20 for use.

Although the invention has been described with the particulars such as specific elements, the limited embodiments, and the drawings, the above description is provided only to help comprehensive understanding of the present invention, and the present invention is not limited to the embodiments. It is obvious to those skilled in the art that various changes and modifications may are available. Therefore, the spirit of the present invention will not be limited to the aforementioned embodiments, and the following claims as well as all modifications or variations belonging to the equivalents of the claims will be within the scope of the invention.

DESCRIPTION OF REFERENCE NUMERALS

| | |
|---|---|
| 10: Inner container | 12: Receiving portion |
| 14: Coupling portion | 14a: Inlet portion |
| 14c: Detachable protrusion | 20: Outer container |
| 22: Detachable groove | 23: Second drain hole |
| 30: Shoulder | 33: First drain hole |
| 40: Discharge unit | 50: Button |
| 52: Discharge passage | 52a: Sealing blade |
| 60: Nozzle | 62: Discharge port |
| 70: Opening/closing unit | 72: Opening/closing rod |
| 74: Elastic member | 80: Connection unit |
| 90: Stopper | |

The invention claimed is:

1. A liquid content-discharging container comprising:

an inner container for accommodating a liquid content;

an outer container surrounding an exterior of the inner container;

a shoulder coupled to the inner container or the outer container;

a discharge unit installed inside the shoulder and connected to the inner container to discharge the liquid content;

a button connected to one side of the discharge unit to operate the discharge unit and having a discharge passage formed inside the button;

a nozzle coupled to one side of the button and a discharge port formed in the nozzle; and an opening/closing unit located within an interior of both the button and the nozzle to simultaneously or continuously open/close the discharge port and the discharge passage while reciprocating due to a discharge pressure of the liquid content, and wherein a sealing blade is formed in the discharge passage of the button and the sealing blade is configured to come into close contact with an outer circumference of the opening/closing unit, wherein the opening/closing unit includes an opening/closing rod reciprocating back and forth by the discharge pressure of the liquid content, and an elastic member for providing elasticity to the opening/closing rod, wherein the opening/closing rod of the opening/closing unit includes a first sealing portion for sealing the discharge port, a second sealing portion for sealing the discharge passage, a fitting portion fitted to the elastic member, and a guide blade protruding from an outer circumference of the opening/closing rod to come into close contact with an inner wall of the discharge passage, and the second sealing portion has a diameter relatively larger than a diameter of the first sealing portion, wherein the sealing blade is formed in a ring-shaped flap extending inwardly from an inner wall of the discharge passage and inclined at a predetermined angle in a discharge direction of the liquid content toward a tip of the opening/closing rod, such that the sealing blade permits the liquid content to pass in the discharge direction and at least partially prevent the liquid content from passing in an opposite direction, wherein when the button is pressed to generate the discharge pressure of the liquid content, the opening/closing rod is pushed rearward by the discharge pressure of the liquid content to create a gap between the sealing blade and the first sealing portion of the opening/closing rod such that the liquid content passes through the gap along the opening/closing rod within the discharge passage toward the tip of the opening/closing rod to be discharged through the discharge port, and wherein when the button is released, the discharge pressure of the liquid content disappears and the opening/closing rod moves forward by an elastic force of the elastic member such that the sealing blade comes into sealing contact with the second sealing portion of the opening/closing rod to close the discharge passage and that the discharge port is closed.

2. The liquid content-discharging container of claim 1, wherein the inner container includes a pouch container having a shape changed when the liquid content accommodated in the pouch container is consumed.

3. The liquid content-discharging container of claim 1, wherein the inner container includes a soft receiving portion in which the liquid content is accommodated, and a hard coupling portion joined to the receiving portion so as to be coupled to the shoulder.

4. The liquid content-discharging container of claim 1, wherein the inner container and the outer container include a protrusion and a groove, respectively, so that the inner container and the outer container are attached to and detached from each other by a rotational operation between the inner container and the outer container.

5. The liquid content-discharging container of claim 1, wherein the shoulder includes a first drain hole and the outer container includes a second drain hole, so that water introduced between the shoulder and the button sequentially passes through the first drain hole and the second drain hole and is discharged to an outside.

6. The liquid content-discharging container of claim 1, wherein the discharge unit includes a pump for pumping the liquid content accommodated in the inner container.

7. The liquid content-discharging container of claim 1, wherein the button and the discharge unit are connected to each other through a connection unit, and the connection unit includes a connection path.

8. The liquid content-discharging container of claim 1, wherein a button stopper is detachably coupled to an outer side of the button to prevent the button from being pressed.

* * * * *